(12) United States Patent
Hélot

(10) Patent No.: US 10,940,759 B2
(45) Date of Patent: Mar. 9, 2021

(54) DISPLAY DEVICE FOR A MOTOR VEHICLE, METHOD FOR OPERATING A DISPLAY DEVICE, CONTROL UNIT, AND MOTOR VEHICLE

(71) Applicant: AUDI AG, Ingolstadt (DE)

(72) Inventor: Jacques Hélot, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/633,514

(22) PCT Filed: Jul. 19, 2018

(86) PCT No.: PCT/EP2018/069571
§ 371 (c)(1),
(2) Date: Jan. 23, 2020

(87) PCT Pub. No.: WO2019/020476
PCT Pub. Date: Jan. 31, 2019

(65) Prior Publication Data
US 2020/0376960 A1  Dec. 3, 2020

(51) Int. Cl.
*B60K 35/00* (2006.01)
*G09G 3/00* (2006.01)
*G02B 30/52* (2020.01)

(52) U.S. Cl.
CPC .............. *B60K 35/00* (2013.01); *G02B 30/52* (2020.01); *G09G 3/003* (2013.01);
(Continued)

(58) Field of Classification Search
CPC ......... B60K 35/00; G02B 30/52; G09G 3/003
See application file for complete search history.

(56) References Cited

U.S. PATENT DOCUMENTS 5,920,256 A  7/1999  Toffolo et al.
6,152,066 A * 11/2000 Knoll ................. B60K 35/00
                                                116/288
(Continued)

FOREIGN PATENT DOCUMENTS

CN   1609910 A    4/2005
CN   102737559 A  10/2012
(Continued)

OTHER PUBLICATIONS

Chinese Office Action dated Jul. 1, 2020 from Chinese Application No. 201880052053.4, 8 pages.
(Continued)

*Primary Examiner* — Sardis F Azongha
(74) *Attorney, Agent, or Firm* — Staas & Halsey LLP

(57) ABSTRACT

A display device for a motor vehicle includes a first, planar display element arranged in a first display plane of the display device, and at least one further, planar display element, each arranged in a further display plane of the display device, upstream of the first display element in a viewing direction of a user. Together with the first display element, the at least one further display element forms a multilayered combination of display elements. Each of the at least one further display element has an at least partly transparent display surface and a visual protection element for setting a degree of a transparency of at least one region of the display element.

21 Claims, 3 Drawing Sheets

(52) U.S. Cl.
CPC ............... *B60K 2370/152* (2019.05); *B60K 2370/1531* (2019.05); *B60K 2370/27* (2019.05); *G09G 2380/10* (2013.01)

(56) References Cited

U.S. PATENT DOCUMENTS

| | | | | |
|---|---|---|---|---|
| 6,542,146 | B1* | 4/2003 | Toffolo | B60K 37/02 345/156 |
| 8,928,682 | B2* | 1/2015 | Bell | G09G 3/003 345/589 |
| 9,605,984 | B2* | 3/2017 | Farell | G09G 3/3611 |
| 10,410,402 | B2* | 9/2019 | Bell | G06T 11/60 |
| 10,578,864 | B2* | 3/2020 | Misawa | G02B 27/0101 |
| 10,657,857 | B2* | 5/2020 | Pance | G06F 3/0346 |
| 2006/0158740 | A1 | 7/2006 | Stoschek et al. | |
| 2007/0171193 | A1* | 7/2007 | Nakamura | B60K 35/00 345/156 |
| 2008/0122865 | A1* | 5/2008 | Vanmoor | G09G 3/003 345/619 |
| 2009/0132130 | A1 | 5/2009 | Kumon et al. | |
| 2009/0201436 | A1* | 8/2009 | Strazzanti | B60K 37/06 349/16 |
| 2012/0188637 | A1* | 7/2012 | Joseph | G02B 30/52 359/478 |
| 2014/0062839 | A1* | 3/2014 | Dominici | B64D 43/00 345/6 |
| 2015/0029211 | A1* | 1/2015 | Weber | G09G 3/00 345/592 |
| 2018/0224662 | A1* | 8/2018 | Yu | G02B 30/26 |
| 2018/0373109 | A1* | 12/2018 | Harazawa | G02F 1/163 |
| 2019/0080673 | A1* | 3/2019 | Li | G06F 3/0488 |

FOREIGN PATENT DOCUMENTS

| | | |
|---|---|---|
| CN | 104243953 A | 12/2014 |
| CN | 105103213 A | 11/2015 |
| CN | 106415666 A | 2/2017 |
| CN | 106597718 A | 4/2017 |
| CN | 106773042 A | 5/2017 |
| CN | 106908958 A | 6/2017 |
| DE | 44 44 471 A1 | 2/1996 |
| DE | 102005026872 A1 | 12/2006 |
| DE | 102014016324 A1 | 5/2016 |
| DE | 102014019122 A1 | 6/2016 |
| DE | 102016100972 A1 | 7/2016 |
| DE | 112015004066 T5 | 5/2017 |
| DE | 102017212912.3 | 7/2017 |
| JP | 2007-127771 | 5/2007 |
| WO | 2009/138066 A2 | 11/2009 |
| WO | 2015/130996 A1 | 9/2015 |
| WO | PCT/EP2018/069571 | 7/2018 |

OTHER PUBLICATIONS

English Translation by WIPO dated Jan. 30, 2020 of the International Preliminary Report on Patentability in corresponding International Patent Application No. PCT/EP2018/069571.
German Office Action for Application No. 10 2017 212 912.3 dated Jan. 10, 2018.
International Search Report for PCT/EP2018/069571 dated Sep. 25, 2018.

* cited by examiner

DISPLAY DEVICE FOR A MOTOR VEHICLE, METHOD FOR OPERATING A DISPLAY DEVICE, CONTROL UNIT, AND MOTOR VEHICLE

CROSS REFERENCE TO RELATED APPLICATIONS

This application is the U.S. national stage of International Application No. PCT/EP2018/069571, filed Jul. 19, 2018 and claims the benefit thereof. The International Application claims the benefit of German Application No. 10 2017 212 912.3 filed on Jul. 27, 2017, both applications are incorporated by reference herein in their entirety.

BACKGROUND

Described below is a display device for a motor vehicle having a plurality of display elements arranged in different display planes of the display device.

As the number of operating functions, driver assistance functions and convenience functions increases, in motor vehicles there is a demand for user interfaces which, firstly, enable simple operation of these functions and, secondly, present a multiplicity of different items of information clearly. Modern motor vehicles have a display device, that is to say an apparatus or an apparatus component for displaying display contents or image contents. Such display devices are preferably configured as a screen of an instrument cluster or as a screen in a center console.

DE 10 2014 019 122 A1 describes a method for operating a display system of an automobile having a display unit with a mirror arrangement, by which a first object and a second object are displayed in two virtual image planes arranged one behind the other. Such a mirror combination brings about a transparency with a plurality of images disposed in the depth. A further mirror combination is described by DE 10 2014 016 324 A1.

In the case of mirror combinations, the disadvantage arises that they require a relatively large amount of structural space, for example in an X- and/or Z-measurement chain of an instrument panel. The representation planes are superimposed, with the result that a displayed graphic can be partly unclear or unsharp.

US 2009/132130 A1 describes a screen of a motor vehicle having an image display apparatus and a transparent screen input apparatus.

Other technical solutions provide transparent screens mounted one behind another. The representation planes are superimposed here, however, with the result that a graphic can be partly unclear or unsharp.

SUMMARY

A problem addressed is that of improving a visibility of displayed information. The stated problem is solved by the devices and the method described below.

Described below is the concept of arranging a plurality of display elements configured in planar fashion in a sandwich-like manner, wherein at least those display elements which are placed in front or upstream of a final display element situated at the back, that is to say such that it faces away, from a viewing direction of the user form at least part of a transparent display surface, and additionally each forms at least part of a visual protection element, wherein the visual protection element is configured to change a degree of a transparency and/or of an opacity depending on a control signal of a control unit, and thus to change a transparency or opacity of at least one partial region of the display element. In this case, display surface is understood to mean a component for displaying an image content or display content, for example a screen.

In other words, the display device has a combination of a plurality of display elements, wherein the upstream display elements in each case have a transparent display surface and a visual protection element, and wherein the respective display element can be switched to be non-transparent, that is to say opaque, or transparent completely or regionally, as necessary. Such a display device is particularly space-saving. A readability of display contents is possible very well as a result since display contents, for example graphics, which are displayed in a rear display plane can be concealed by the switchable visual protection element of an upstream display element. A perspective depth effect results and displayed information can thus be read very much better. This also results in increased driving safety since the user acquires the information more quickly.

The superimposition of the layers, that is to say of the display elements, becomes possible by virtue of the fact that the visual protection element can be switched to be transparent completely or regionally (that is to say in segments). The devices and the method described herein afford an increased flexibility since, for example, a plurality of graphics can thus be superimposed in the depth where this is desired for the depth effect, and not be superimposed where this is necessary for the readability (for example a blue circle with information concerning an engine speed, a selected gear and/or a current speed in a corresponding image). A three-dimensional combination of display planes can become a two-dimensional combination by the switchable visual protection element of a front display element, for example, being switched to be non-transparent.

The display device for the motor vehicle described herein includes a first, planar display element arranged in a first display plane of the display device. The display device also has at least one further, planar display element arranged in each case in a further display plane of the display device and arranged upstream of the first display element in a viewing direction of a user of the motor vehicle. In other words, the respective further display plane is superimposed on the first display plane, that is to say that the at least one further display element is superimposed on the first display element. Each of the display elements thus lies in a different display plane, as a result of which a display content can in each case be displayed in the plurality of display planes. Viewing direction here is understood to mean that direction in which a user of the motor vehicle looks at the display device in order to view displayed information. Preferably, in a state in which the display device is installed in the motor vehicle, the viewing direction can lie in a motor vehicle longitudinal axis ("X-axis"), and preferably run in the direction of travel.

The display device is characterized in that together with the first display element the at least one further display element forms a multilayered combination of display elements, and the at least one further display element includes in each case an at least partly transparent display surface and in each case a visual protection element arranged on the display surface and configured to set a degree of a transparency and/or a degree of an opacity depending on a control signal of a control unit. The visual protection element here is arranged on the display surface in a planar fashion.

In other words the visual protection element can at least partly conceal and/or allow a view of a further display element situated behind it or below it. In other words, the visual protection element can change a transparency or opacity over the whole area or in segments, and hence a transparency or opacity of at least one partial region of the display element in relation to a visibility of a display element situated below or behind the latter.

The respective visual protection element can be arranged behind or—depending on the orientation in the motor vehicle—below the respective display surface in the viewing direction. If the visual protection element changes from a transparent state to an opaque state, for example, then a display content output by the associated display surface of the display element can be viewed by the user, while a display content of a display element situated further back or underneath is no longer discernible. If only a partial region of the visual protection element is changed over to opaque, then display contents of both display elements can be viewed, with the exception of a display content that is output by the succeeding display element and is concealed by the partial region switched to be opaque. A highly plastic, three-dimensional effect of a combination of display contents of different display planes can be produced as a result. Moreover, different display contents, for example relevant graphics, can thus be highlighted with particularly sharp contours in a manner governed by the situation.

The visual protection element can be configured to change between a transparent state and an opaque state, i.e. between a fully transparent state and a fully opaque state. Particularly the better readability of the visible graphics displayed is significantly increased once again as a result. The 3D effect is achieved particularly effectively in the fully transparent state.

The visual protection element can preferably be configured as a switchable film. Such a visual protection element can easily be arranged on a display surface, for example by lamination or adhesive bonding. Such a display device is particularly structural-space-saving and with highly developed technology the 3D effect and the further advantages mentioned above can be made possible on an extremely small space. Moreover, a transparency of the at least one further display element is only slightly impaired by, for example, conductor tracks of the visual protection element.

To coordinate a particularly great diversity of display contents or image elements, in accordance with a further embodiment, the display device can include at least two further display elements.

The problem stated above is solved by a method for operating a display device according to any of the embodiments described above, the method being carried out by a control unit. A control unit here is understood to mean an apparatus or an apparatus component for receiving and evaluating signals, and for generating control signals. The control unit can be configured for example as a control chip or a controller and may be a component of the display device.

The method firstly generates an image control signal describing an image having at least two image elements or display contents, wherein one of the at least two image elements or display contents is to be displayed by one of the display elements, and wherein another of the at least two image elements or display contents is to be displayed by another of the display elements. This is followed by, depending on the image control signal generated, setting a degree of transparency or a degree of opacity of at least one visual protection element, which can preferably have or assume in each case a size of a pixel, that is to say can be at the pixel level, and outputting the image control signal and thereby displaying the respective image element on the respective display element and setting a transparency or opacity of the at least one visual protection element, thereby providing the advantages mentioned above.

The problem stated above is solved by a control unit, which is wherein it is configured to carry out an embodiment of the method. The control unit may include a processor unit, that is to say an apparatus component or a component for electronic data processing, wherein the processor unit may include at least one microcontroller and/or at least one microprocessor. The processor unit can be configured to execute program code, wherein the program code can be stored on a data memory and be configured, upon execution by the processor unit, to cause the control unit to carry out the method described herein, thereby providing the advantages mentioned above.

The problem stated above is likewise solved by an above-described embodiment of the display device including an embodiment of the control unit, thereby providing the advantages mentioned above.

The stated problem is solved by a motor vehicle, which can be configured as an automobile, for example as a car, wherein the motor vehicle has an embodiment of the display device described herein and/or an embodiment of the control unit described herein, thereby providing the advantages already mentioned.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
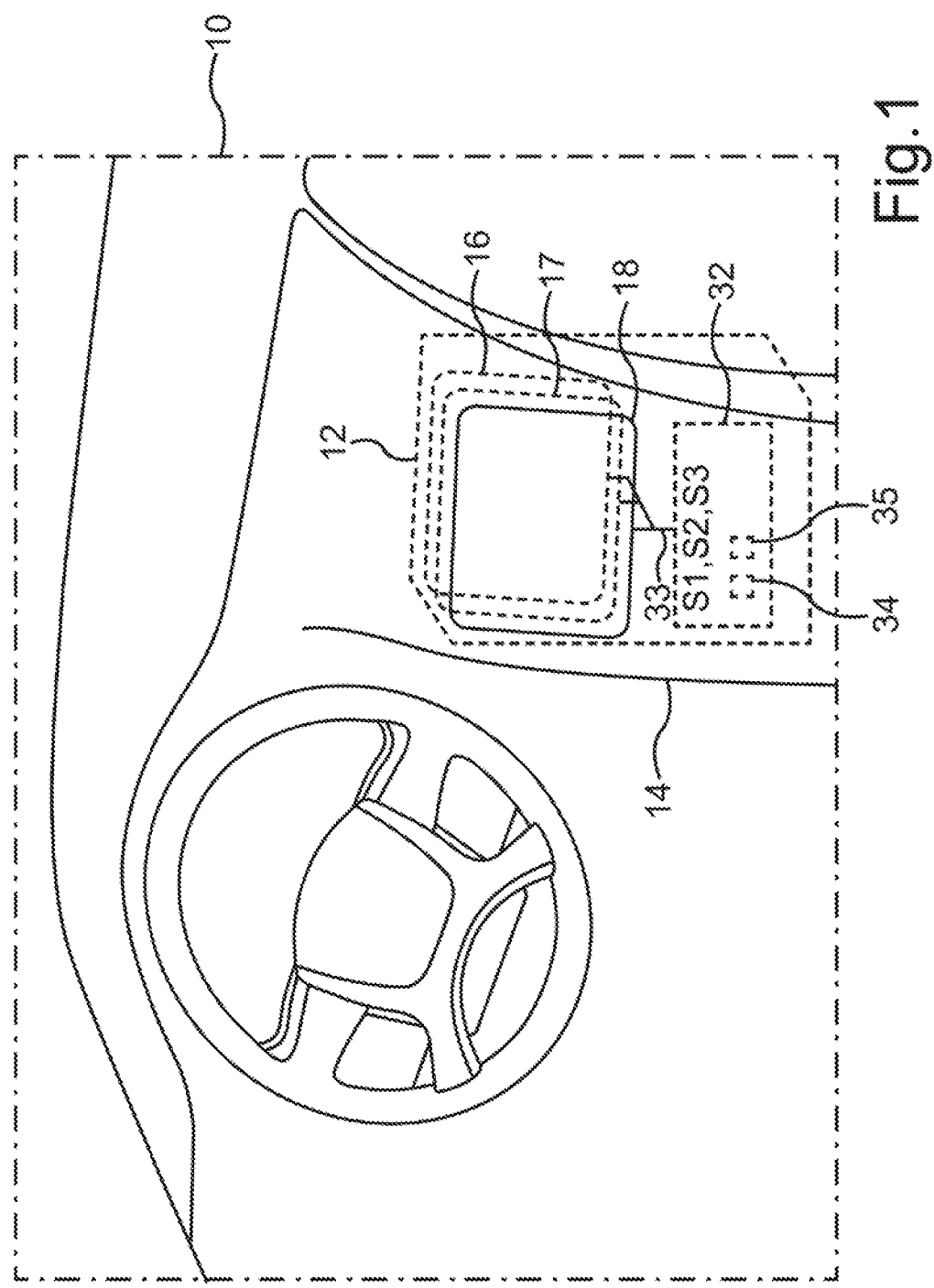
FIG. 1 is a schematic illustration concerning a first embodiment of the display device and a first embodiment of the method.

Reference will now be made in detail to the preferred embodiments, examples of which are illustrated in the accompanying drawings, wherein like reference numerals refer to like elements throughout.

In the case of the exemplary embodiments, the described components of the embodiments each constitute individual features which are to be considered independently of one another and which each also develop the invention independently of one another and should thus also be regarded both individually and in a different combination from that shown. Furthermore, the embodiments described are also supplementable by further features among those already described.

In the figures, functionally identical elements are provided in each case with the same reference characters.

FIG. 1 illustrates the principle of the display device on the basis of a first exemplary embodiment. In this respect, FIG. 1 shows a motor vehicle 10, which can be configured for example as a car. A first exemplary embodiment of the display device 12 can be incorporated for example in a center console 14 or in an instrument cluster of the motor vehicle 10, or in a dashboard.

The display device 12 here includes three planar display elements 16, 17, 18, for example. A first display element 16 can for example be non-transparent and be arranged at the back from the user's viewpoint, i.e. be arranged in a rear display plane terminating the combination of the display elements 16, 17, 18 in the viewing direction. This first display element 16 can be configured for example as a screen known to the person skilled in the art from the related art, for example as an OLED screen or a TFT screen.

The first display element 16 in the example in FIG. 1 can be superimposed, preferably superimposed congruently, for example by two further, transparent display elements 17, 18. The latter here can be configured for example in each case as an OLED screen.

FIG. 1 here schematically shows sandwich-like stacking of the display elements 16, 17, 18, the individual display elements 16, 17, 18 being illustrated in a manner spaced apart distinctly from one another, for the sake of better elucidation. However, the display elements 16, 17, 18 can actually be close together or near one another, or bear one on top of another.

The respective display surfaces of the further display elements 17, 18 here are at least partly transparent; in other words, here each of the further display elements 17, 18 has at least one transparent region of the respective display surface. Transparent display surfaces are known to the person skilled in the art for example as liquid crystal screens.

Each of the display elements 17, 18 has a visual protection element 20, which can be configured for example as so-called "intelligent glass", that is to say as electrically switchable glass, the light transmissivity of which can be altered by a voltage being applied, or can be configured as a switchable film. The further display elements 17, 18 in FIG. 1 each has a visual protection element 20, which is not shown in FIG. 1 for reasons of clarity.

Figure 2:
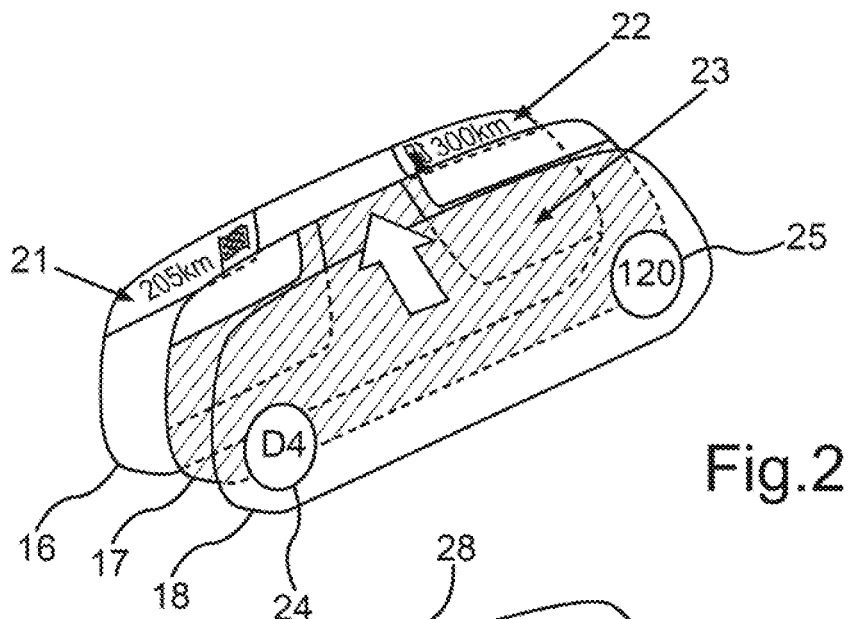
FIG. 2 is a schematic illustration concerning a further embodiment of the display device.

The detailed construction of the combination of the display elements 16, 17, 18, which can be arranged for example in a display device 10 of an instrument cluster, is shown in FIG. 2, wherein for example the first display element 16, which is superimposed by the further display elements 17, 18, may have two display regions 21, 22 for displaying image or display contents, and can display for example a remaining distance of a journey route ("205 km") in a top left corner and a range of current tank contents ("300 km") in a top right corner.

For reasons of clarity, only the display elements 16, 17, 18 are shown in FIG. 2, FIG. 3, FIG. 4, and FIG. 5. However, such display elements can be for example parts of the display device 12 shown in FIG. 1.

By the display element 17 being superimposed on the first display element 16, for example, a display region 23 can omit the display regions 21, 22 and display for example a perspectively represented course of a travel route with, for example, a direction of travel arrow.

The further display element 18, which can be arranged in a manner superimposed on the further display elements 16, 17 in the example in FIG. 2, may have, for example, two display regions 24, 25, which can display, for example, a current gear ("D4") and a current speed ("120") of the motor vehicle 10.

By way of example, a changeover from transparent to semitransparent or from transparent to opaque can be effected upon a voltage being applied.

Figure 3:
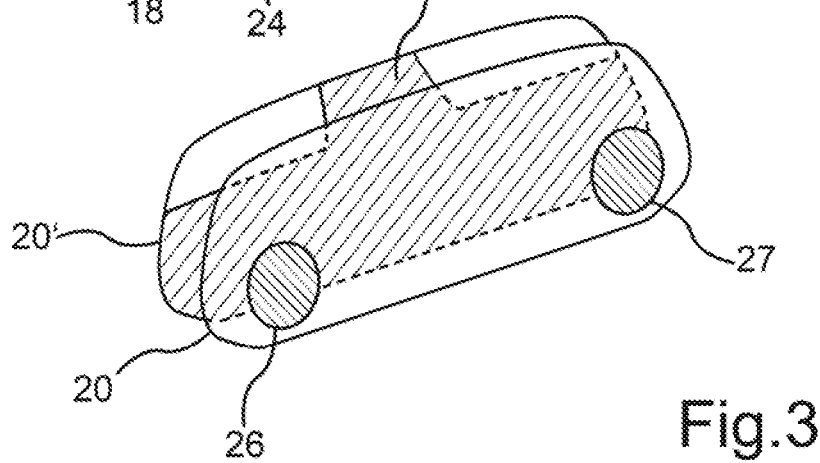
FIG. 3 is a schematic illustration concerning a further embodiment of the display device.

FIG. 3 shows by way of example a visual protection element 20 of the display element 18 shown in FIG. 2 and a visual protection element 20' of the display element 17 shown in FIG. 2. The visual protection element 20 may have two segments 26, 27, for example, which, in the arrangement with the display element 18, can correspond to the corresponding display zones 24, 25. In the example in FIG. 3, the regions or segments 26, 27 can be switched to be opaque. Analogously thereto, a segment 28 of the visual protection element 20', which can be arranged on the display element 17 from FIG. 2, can likewise be switched to be opaque or semi-opaque. Here the segment 28 can correspond to the corresponding display region 23 of the display element 17.

Figure 4:
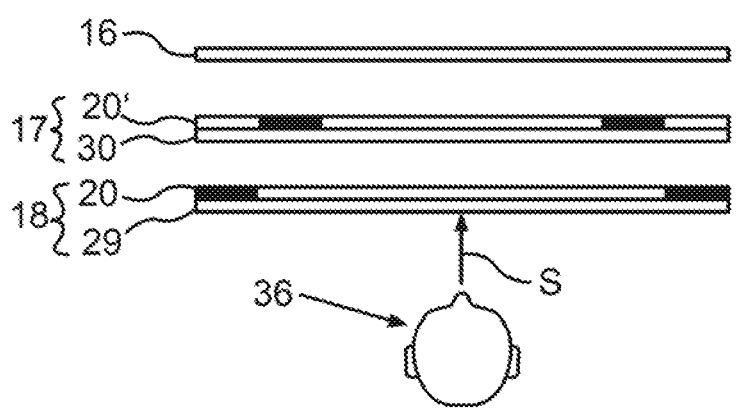
FIG. 4 is a schematic illustration concerning a further embodiment of the display device.

FIG. 4 shows, in a plan view, once again the layer-like arrangement of the display elements 16, 17, 18, wherein each of the respective display elements 17, 18 may have a visual protection element 20, 20' switched by way of example and in each case a display surface 29, 30. An occupant 36 looks by way of example in the viewing direction S at the arrangement of the display elements 16, 17, 18 of an exemplary display device 12, the further constituent parts of which are not shown in FIG. 4 for reasons of clarity.

In other words, for example a film which is switchable in a segmented manner can be arranged as a visual protection element 20, 20' behind each of the transparent display surfaces 17, 18, which film can be switched to be transparent and/or black in segments, for example.

As an alternative to the embodiment of the examples described, a further display element 17, 18 can be configured in integral fashion as a switchable display surface 29, 30, for example as a screen composed of "intelligent glass". In other words, the respective visual protection element 29, 30 can be integrated into a display surface 17, 18 and be configured for example as a circuit for setting the degree of transparency.

A segment 26, 27, 28 may include a multiplicity of switching elements, for example, which, in a manner comparable to pixel elements, can be of pixel size dimensions and can be switched independently of one another. A visual protection element 20, 20' can optionally include lines for transmitting the voltage for different segments or switching elements, wherein the lines can be configured as at least partly transparent in order to impair a transparency of the segment as little as possible. If a visual protection element 20, 20' configured by way of example as a film attains a maximum transparency of 50%, for example, then in the case of two display elements 17, 18 placed one above the other, for example, a total transparency of 25%, for example, can be brought about. In order to compensate for such a maximum total transparency reduced by possible lines of the visual protection element 20, 20', it can be provided, for example, that the first display element 16 can be designed and configured in such a way that image contents can be output in colors that are as bright and strong as possible.

Figure 6:
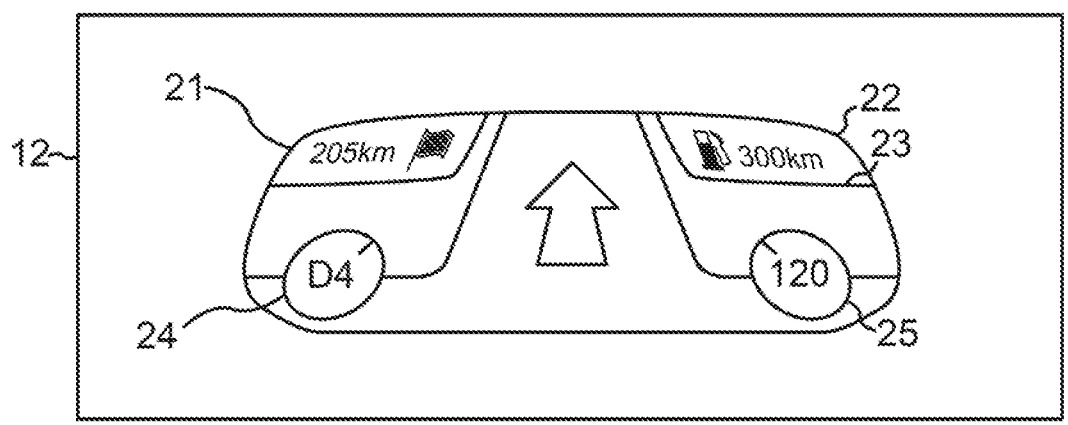
FIG. 6 is a schematic illustration concerning a further embodiment of the display device.

By virtue of the segments 26, 27 switched to be opaque—as shown in FIG. 3—, in the region of the display zones 24, 25 of the further display element 18 only the image contents of the display zones 24, 25 of the display element 18 can be visible to the user since corresponding regions below the display element 18 are concealed. Analogously, the image displayed by the display element 17 in the display region 23 can be visible, but a corresponding region of the display element 16 cannot be visible. By virtue of the regions or segments which are switched to be still transparent in the visual protection elements 20, 20', the result for the user is the overall view with a depth effect shown in FIG. 6, in which the user can see clearly and sharply the display regions 24, 25 of the display element 18, the display region 23 of the display element 17, and the display regions 21, 22 of the display element 16. The overall view illustrates the advantages of the display device 12, primarily a good depth effect and better readability of the displayed image content.

Figure 5:
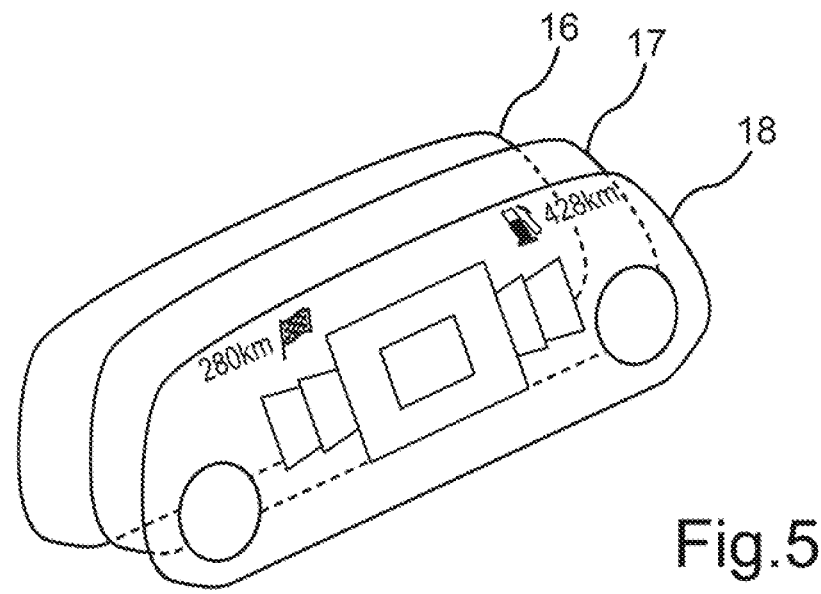
FIG. 5 is a schematic illustration concerning a further embodiment of the display device.

FIG. 5 shows a further exemplary embodiment, in which for example a visual protection element 20 of the further display element 18 superimposed on the other display elements 16, 17 can be switched fully or completely to be non-transparent, that is to say opaque, because for example the display element 18 can output the represented graphics or image elements or display contents over the whole area. Possible image contents output by the further display elements 16, 17 cannot then be visible.

Control of the display elements 16, 17, 18, that is to say control of the outputting of image contents or display contents by the respective display surface, and control or switching of the respective visual protection elements 20, 20', can be carried out for example by a control unit 32, which is illustrated as control unit 32 of the display device 12 in the example in FIG. 1.

Alternatively, the control unit 32 can be for example a controller or a control circuit board of the motor vehicle 10, which can be arranged structurally separately from the display device 12, and can be for example a component of an infotainment system or of an on-board computer of the motor vehicle 10. The control unit 32 is connected to the individual display elements 16, 17, 18 by a data communication connection 33. The data communication connection 33 can be for example a wireless data communication connection 33, for example a WLAN or Bluetooth connection, alternatively a wired data communication connection 33, for example a data bus of a data bus system.

The control unit 32 in FIG. 1 includes an optional processor unit 34, which may have a plurality of microprocessors, for example. The control unit 32 of the display device 12 in FIG. 1 likewise includes an optional data memory 35, which can be configured for example as a memory card or memory chip. By way of example, program code for carrying out the method can be stored on the optional data memory 35.

In S1, the control unit generates an image control signal, which can describe for example one image having a plurality of image elements or display contents, or a plurality of images, and an assignment of the corresponding image element or display content (or image) to one of the display elements 16, 17, 18, and to one of the display regions of the respective display element 16, 17, 18.

In addition, the image control signal describes the switching of the respective visual protection element 20, 20' of the display elements 17, 18. In other words, the image control signal describes a state to be set of the corresponding visual protection element 20, 20', that is to say a transparency or opacity to be set, optionally the corresponding segment to be switched of the visual protection element 20, 20'. Depending on the image control signal generated, a state of the respective visual protection element 20, 20' is set by the setting of a corresponding degree of transparency or degree of opacity of the respective visual protection element 20, 20', or of the segments 26, 27, 28 (S2). In addition, in S3, the image control signal is output by the display elements 16, 17, 18, as a result of which the respective image element or respective display content is displayed on the respective display elements 16, 17, 18. The segments 26, 27, 28 can be shrunk to pixel level, for example, for maximum flexibility.

In other words, the image control signal describes tailored switching of the corresponding visual protection element 20, 20' and the distribution of the image elements or display contents among the display elements 16, 17, 18. Thus, in other words, an orchestration of the display elements 16, 17, 18 is effected.

Overall, the exemplary embodiments illustrate how display elements 16, 17, 18 are provided which can be switched to be transparent in a segmented manner, for example.

In accordance with a further exemplary embodiment, can for example transparent screens ("displays"), for example OLED screens (cf. display elements 16, 17, 18 in the figures), which, at a rear side, for example, can be provided with a respective visual protection element 20, 20' configured as a film, for example, wherein the visual protection elements 20, 20' can be switched optionally to be transparent and/or to be non-transparent in a segmented manner, for example. Exemplary visual protection elements 20, 20' are known to the person skilled in the art from the related art and are provided by the company Gauzy, for example. The exemplary switchable segments 26, 27, 28 can correspond for example to functional regions in each case of a graphical user interface display ("GUI display"), that is to say of the corresponding display surfaces 29, 30.

By way of example, a plurality of such display sandwiches can be positioned one behind another, wherein an image with a depth effect arises if certain or all regions of the exemplary switchable film are switched for example to transparent (see FIG. 2 to FIG. 6). The advantages mentioned above are afforded. A 3D combination can become a 2D combination, for example, by a switchable layer on the front display, that is to say a visual protection element 20 of the display element 18, being switched for example to be non-transparent (cf. FIG. 5).

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A display device for a motor vehicle, comprising:
   a first display element arranged in a first display plane of the display device; and
   at least one further display element, each arranged in a further display plane of the display device upstream of the first display element in a viewing direction of a user, the first display element and the at least one further display element forming a multilayered combination of display elements, each of the at least one further display element having an at least partly transparent display layer and a visual protection element setting a degree of transparency of at least one region of the display element, the visual protection element being configured as a switchable film on the at least partly transparent display layer.

2. The display device according to claim 1, wherein the visual protection element is arranged at least one of behind and below the least partly transparent display layer of each further display element in the viewing direction.

3. The display device according to claim 2, wherein the visual protection element of each further display element is configured to change between a transparent state and an opaque state.

4. The display device according to claim 3, wherein the display device comprises at least two further display elements.

5. The display device according to claim 1, wherein the visual protection element of each further display element is configured to change between a transparent state and an opaque state.

6. The display device according to claim 1, wherein the display device comprises at least two further display elements.

7. The display device according to claim 1, wherein the switchable film is laminated on the at least partly transparent display layer.

8. The display device according to claim 1, wherein the switchable film is adhesively bonded to the at least partly transparent display layer.

9. A method for operating a display device, comprising:
generating, by a control unit, an image control signal describing an image having at least two image elements, a first image element of the at least two image elements being displayed by a first display element arranged in a first display plane of the display device, and a second image element of the at least two image elements being displayed by a second display element arranged in a second display plane of the display device upstream of the first display element in a viewing direction of a user, the first and second display elements forming a multilayered combination of display elements, the second display element having an at least partly transparent display layer and a switchable film on the at least partly transparent display layer, forming a visual protection element setting a degree of transparency of at least one region of the second display element;
setting, by the control unit in dependence on the image control signal, the degree of transparency of the visual protection element;
outputting, by the control unit, the image control signal; and
displaying the first and second image elements on the first and second display elements with the degree of transparency determined by the at least one visual protection element.

10. The method according to claim 9, wherein the visual protection element has a minimum size of a pixel.

11. The method according to claim 9, wherein the switchable film is laminated on the at least partly transparent display layer.

12. The method according to claim 9, wherein the switchable film is adhesively bonded to the at least partly transparent display layer.

13. A control unit controlling operation of a display device, comprising:
at least one processor configured to
generate an image control signal describing an image having at least two image elements, a first image element of the at least two image elements being displayed by a first display element arranged in a first display plane of the display device, and a second image element of the at least two image elements being displayed by a second display element arranged in a second display plane of the display device upstream of the first display element in a viewing direction of a user, the first and second display elements forming a multilayered combination of display elements, the second display element having an at least partly transparent display layer and a switchable film on the at least partly transparent display layer, forming a visual protection element setting a degree of transparency of at least one region of the second display element,
setting, in dependence on the image control signal, the degree of transparency of the visual protection element,
outputting the image control signal, and
displaying the first and second image elements on the first and second display elements with the degree of transparency determined by the at least one visual protection element.

14. A motor vehicle, comprising at least one of a display device according to claim 1 and a control unit according to claim 13.

15. The motor vehicle according to claim 14, wherein the visual protection element is arranged at least one of behind and below the least partly transparent display layer of each further display element in the viewing direction.

16. The motor vehicle according to claim 15, wherein the visual protection element of each further display element is configured to change between a transparent state and an opaque state.

17. The motor vehicle according to claim 16, wherein the display device comprises at least two further display elements.

18. The motor vehicle according to claim 14, wherein the visual protection element of each further display element is configured to change between a transparent state and an opaque state.

19. The motor vehicle according to claim 14, wherein the display device comprises at least two further display elements.

20. The motor vehicle according to claim 13, wherein the switchable film is laminated on the at least partly transparent display layer.

21. The motor vehicle according to claim 13, wherein the switchable film is adhesively bonded to the at least partly transparent display layer.

* * * * *